United States Patent
Chang et al.

(10) Patent No.: US 6,899,782 B1
(45) Date of Patent: May 31, 2005

(54) ORIENTATION OF SHORT FIBERS IN A CONTINUOUS PROCESS

(75) Inventors: Ching-Chian Chang, Copley, OH (US); Robert Henry Vogliano, Tallmadge, OH (US); Cheng Shaw, Copley, OH (US)

(73) Assignee: The Goodyear Tire & Rubber Company, Akron, OH (US)

( * ) Notice: Subject to any disclaimer, the term of this patent is extended or adjusted under 35 U.S.C. 154(b) by 0 days.

(21) Appl. No.: 10/031,963

(22) PCT Filed: Sep. 7, 1999

(86) PCT No.: PCT/US99/20389

§ 371 (c)(1),
(2), (4) Date: Jan. 22, 2002

(87) PCT Pub. No.: WO01/17747

PCT Pub. Date: Mar. 15, 2001

(51) Int. Cl.[7] .......................... B29C 47/00; B32B 31/30
(52) U.S. Cl. ................. 156/244.11; 152/209.4; 152/458; 156/244.24; 264/108; 264/211.12; 264/328.12
(58) Field of Search .............................. 152/209.4, 458; 156/289, 128.6, 244.11, 244.24; 264/108, 328.12, 210.1, 211.12

(56) References Cited

U.S. PATENT DOCUMENTS

| | | | |
|---|---|---|---|
| 4,014,969 A | * 3/1977 | Gorter et al. | 264/108 |
| 4,056,591 A | * 11/1977 | Goettler et al. | 264/108 |
| 4,925,512 A | 5/1990 | Briand | 156/201 |
| 5,132,549 A | 7/1992 | Allan et al. | 264/70 |
| 5,702,546 A | * 12/1997 | Itoh et al. | 152/209.4 |
| 6,106,752 A | * 8/2000 | Chang et al. | 264/108 |
| 6,387,313 B1 | * 5/2002 | Chang et al. | 264/328.12 |

FOREIGN PATENT DOCUMENTS

| | | | | |
|---|---|---|---|---|
| EP | 0468306 | | 1/1992 | ........... B29C/47/14 |
| JP | 62-191204 | * | 8/1987 | |
| JP | 1-304924 | * | 12/1989 | |
| JP | 3-258603 | * | 11/1991 | |
| JP | 4-90317 | * | 3/1992 | |
| WO | 9813185 | | 4/1998 | ........... B29C/45/00 |

OTHER PUBLICATIONS

Patent Abstracts of Japan, vol 014, no 093 (M–0939), Feb. 21, 1990 & JP 01 304924 A (Bando Chem Ind Ltd), Dec. 8, 1989 cited in the abstract.

* cited by examiner

*Primary Examiner*—Steven D. Maki
(74) *Attorney, Agent, or Firm*—Nancy T. Krawczyk; David E. Wheeler

(57) ABSTRACT

A method and apparatus for continuously processing fiber into an elastomeric component uses an expanding die (11, 11a) for orienting fibers in other than the processing direction of the extrusion. In one embodiment, an injection mold (50) is used with the expanding die (11), and in another embodiment, an extruder (30) is used with expanding die (11a). Processing parameters may be alteredto control the direction of orientation of fibers (20) in the elastomer component. Orientation of fibers (20) in an extrudate (17) is dependent on the processing speed viscosity of the elastomer, pressure of extrusion, the length $l_1$ and $l_2$ and height $h_1$ and $h_2$ of gate (12) and expansion cavity (14), respectively, of the expansion die (11, 11a).

10 Claims, 5 Drawing Sheets

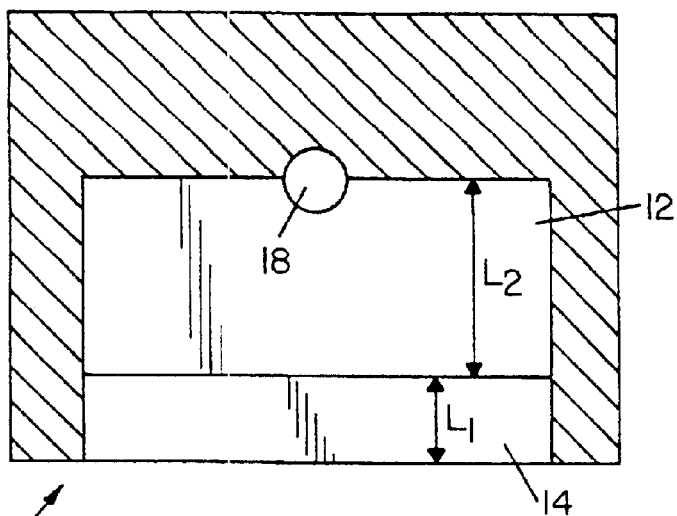
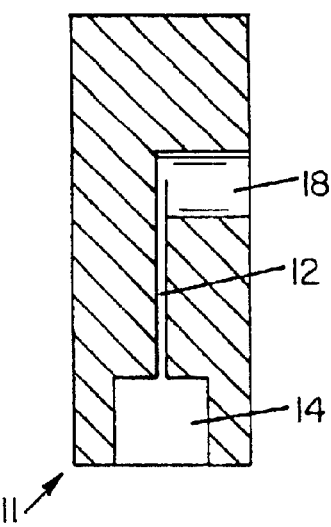
FIG. 1    FIG. 2
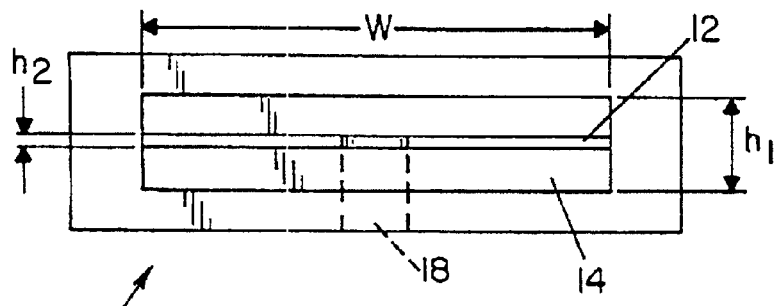
FIG. 3
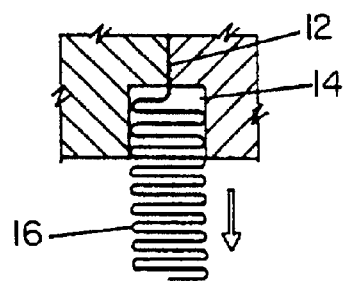
FIG. 4

ORIENTATION OF SHORT FIBERS IN A CONTINUOUS PROCESS

TECHNICAL FIELD

The invention relates to a method and apparatus for orienting fibers in a polymer, and an article using such fibers.

BACKGROUND ART

Composite articles comprising an elastomeric base material and reinforcing fibers are known in the art. Reinforcing fibers improve mechanical properties, such as abrasion resistance, tensile strength, compression resistance, and the like in a composite article. Fiber distribution and orientation affect such properties, and controlling fiber orientation is important for providing a composite article having specific mechanical properties.

Known techniques for orienting reinforcing fibers in an elastomeric material are generally methods for orienting fibers in a composite in a direction which is consistent with and parallel to the material flow direction in processing equipment. It is difficult to orient reinforcing fibers in a composite article in a direction which differs from the direction of material flow, and it is especially difficult to orient fibers in a composite in a direction perpendicular to the flow of the material in processing equipment.

One method for orienting fibers in a composite article in a direction which varies from the direction of material flow is disclosed in U.S. Pat. No. 5,156,907 wherein a heated mixture of molding compound (glass) and fibers (carbon) is injected through an elongated injection port into a die. The injection port has a thickness which is purported to be between 30%–70% of the die thickness. The optimum fiber length is 0.5 inches (1.27 cm) for the particular carbon fiber/glass matrix utilized.

U.S. Pat. No. 5,281,380 discloses a fiber reinforced elastic sheet in which staples are oriented in the vertical direction of the sheet. Staple material, such as Nylon 66, is mixed into thermoplastic material and extruded through a molding die. The molding die includes a weir portion which is said to initially orient the fibers in the flow direction. Downstream from the weir portion is a flow passage which has a dimension at least twice that of the weir portion. After passing through the weir portion, the flow direction is changed, thereby changing the fiber orientation with respect to the sheet surface. The sheet so formed can then be further processed for an intended application.

JP 1304924 A (dated Dec. 8, 1989) describes orientation of short fibers in a rubber matrix using an extruder with an expanding die. An elastomer is extruded through a passage running from a cylindrical inlet space to a cylindrical outlet space to produce a cylinder axis body.

BE 842865 (dated Dec. 12, 1976) describes extrusion dies for balancing flow orientation, causing radial divergence to counter longitudinal orientation of fiber, filers, etc.

RD 186061 A (dated Oct. 10, 1979) describes dispersed fibers in a reinforced strip, for example a bead filler, by extruding the strip through a die which orients fibers mainly in a plane perpendicular to the extrusion axis. The fibers are extruded in a thermoplastic or thermosetting polymer.

In PCT/US96/15237, methods and apparatuses are described for orienting short fibers (fibers having a length of 0.1 microns to $10^3$ microns) in a composite article formed by injection molding a molding compound comprising a fiber/elastomeric material blend. The fibers utilized are known as "short fibers" in the art.

DISCLOSURE OF INVENTION

A method of continuously producing fiber reinforced elastomer components having length, depth and width, and having fiber orientation at angles to the length direction of the component, comprises the sequential steps of: (a) extruding, injecting or calendering a fiber reinforced elastomer such that fibers are oriented in the direction of processing of the elastomer, (b) forcing the elastomer through a die (11) having a gate (12) having a gap height $h_2$ larger than the average length of the fiber; (c) providing an abrupt expansion cavity (14) in the die (10) adjacent to the gate (12); (d) maintaining the viscosity of the elastomer such that the elastomer passes through the gate (12) as a ribbon (16) of elastomer; (e) compressing the ribbon (16) of elastomer in the expansion cavity (14) into an elastomer component such that the fibers are substantially oriented at angles to the processing direction in the expansion cavity (14); (f) collecting the component for storage or for direct use in an elastomeric product. In the method wherein the viscosity of the elastomer is maintained at Mooney viscosity of 30 to 80, the elastomer is processed at a speed of 100 to 1000 mm/sec linear speed at the gate (12) and 1 to 100 mm/sec in the expansion cavity (14).

In one embodiment an injection mold (50) is used for orienting fibers in an elastomer according to step (a), and further comprises the steps of (g) attaching die (11) to the injection mold (50); (h) forcing polymer through sprue (18) using ram (52); (I) collecting extrudate (17) having oriented fibers (20) therein on collection roll (78). In addition a scrim (72) may be applied to the extrudate (17) as the extrudate is collected.

Also, the method may include the further steps of: (j) applying a pressure of 10 to 30 thousand psi on polymer (54) with ram (52); and (k) applying a clamp force of 3 tons with pneumatic arm (56) against die (11).

In a second embodiment, an extruder (30) is used for mixing fibers and an elastomer according to step (a), and comprises the further steps of: (g) attaching an expanding die (11a) having a tapered runner (22) to the end (31) of extruder (30); (h) feeding an elastomer into extruder (30) through inlet (32); (i) mixing the elastomer in the extruder (30); (O) feeding elastomer through end (31) of extruder (30) into tapered runner (22) of die (11a); and (k) collecting extrudate (17a) from die (11a). The method may further comprise the steps of: (I) maintaining the extrusion pressure in the extruder (30) at 5000 psi; and (m) maintaining clamping pressure on the die at 5000 psi.

The methods of the invention may include the further step of controlling the viscosity of an elastomer, the speed of extrusion, the length, height and width of the gate (12) and the expansion cavity (14) to maintain control of fiber orientation in an elastomer according to the formula % fibers oriented perpendicular to processing direction $$\propto \text{extrusion pressure} \times \text{speed of extrusion} \times \text{viscosity of elastomer} \times \frac{l_2}{h_2}$$

An expansion cavity (14) used in expansion die (11) may have a gap height $h_1$ of 10 to 100 times the height $h_2$ of the gate (12).

The method may include the further step of forming a tire component with the die and using an expansion cavity (14) having a length of 1.25 to 5.0 mm.

An apparatus for producing an elastomeric component comprises an injection mold (50) having: (a) a chamber (55)

for containing an elastomer (54); (b) a ram (52) for pressing elastomer (54) through sprue (18); (c) a pneumatic arm (56) associated with a moving mold (10a) and a fixed mold (10b) attached to end (51) of injection mold (50), having die plates (11) disposed therebetween characterized in that die plates (11) comprise an expansion die (11) for changing the orientation of fibers (20) in an elastomeric material, the expansion die comprising; (d) at least one inlet (18) for directing an elastomeric material into the die, (e) a narrow slit or gate (12) for receiving elastomer from the inlet (18) of gate (12) having a height $h_2$ and a length $l_2$ adapted to form said elastomer into a ribbon of elastomer (16) and orient fibers (20) in said elastomeric ribbon (16) in the length direction $l_2$ of the gate; (f) and a cavity portion (14) adjacent the gate (12), the cavity portion (14) having a length $l_1$ and height $h_1$ adapted to collect and compress the ribbon (16) of elastomer and orient the fiber (20) substantially in the height direction of the cavity (14). A roller system (70) which comprises: (g) scrim take off roll (74) in proximity to pulley (76) which is adapted to direct scrim (72) and extrudate (17) to take up roll (78) may be used with injection mold (50).

A second apparatus for producing an elastomeric component comprises a twin screw extruder (30) having: (a) at least one inlet port (32) and a plurality of mixing segments (34,36,38,40) and an extrusion end (31); (b) a die (11a) having a tapered runner (22) attached to said extrusion end (31) such that elastomer exiting extrusion end (31) enters tapered runner (22) and is forced through gate (12) into expansion cavity (14); The apparatus of claim 14 comprising injection mold (50) and roller system (70) as described above.

Also provided is a pneumatic tire (80) comprising at least a pair of annular beads (82), at least one carcass ply (84) wrapped around said beads, tread (86) disposed over said carcass plies in a crown portion (88) of the tire, and sidewalls (89) disposed between the tread and the beads, wherein the tread (86) comprises a rubber compound containing short fibers (20) oriented substantially perpendicular to the surface of the tread, wherein a tread component used to form the tread (86) is made by forcing tread rubber through an expanding die. The tread (86) of tire (80) is made by extending a narrow component of fiber reinforced tread rubber through an expanding die (11), and laying the tread rubber in the crown area (88) of a tire. In the illustrated embodiment, tread rubber component comprises a plurality of turns on the tire carcass.

In an alternative embodiment the tread (86) is divided into regions (21,21a,21b), and the fiber reinforcement (20,20a, 20b) is oriented in a specific region independently of the orientation of the fiber reinforcement in other regions.

BRIEF DESCRIPTION OF THE DRAWINGS

FIG. 1 is a top view of an expanding die of the invention.

FIG. 2 is a side view of an expanding die.

FIG. 3 is an end view of an expanding die.

FIG. 4 illustrates a flow pattern (side view) of elastomer in an expanding die.

DETAILED DESCRIPTION OF THE INVENTION

Figure 5:
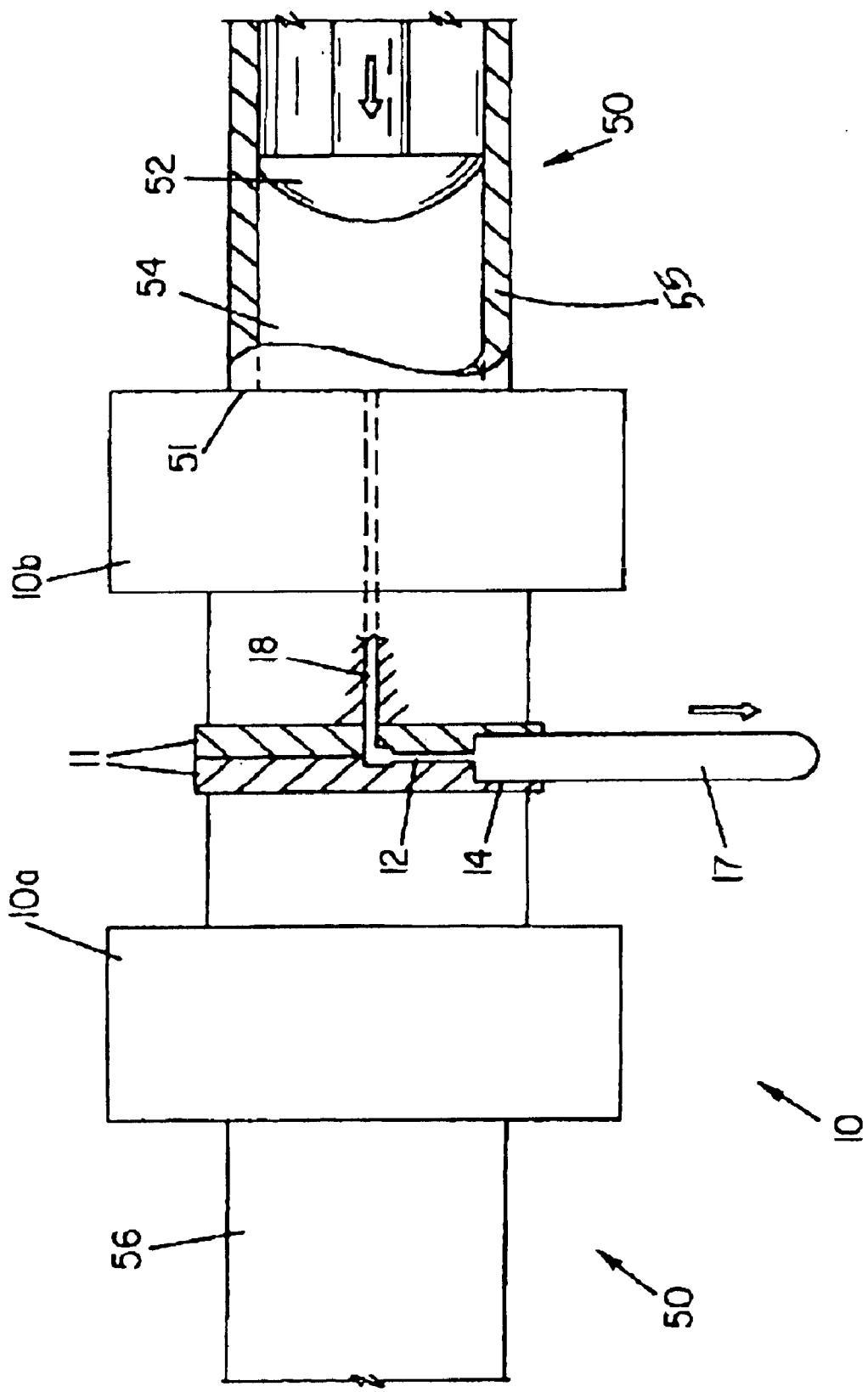
FIG. 5 illustrates the fitting of an expanding die to an injection mold.

With reference now to FIGS. 1 to 3, a die 11 is illustrated in a cross section top view, a cross section side view and an end view respectively. The die 11 has a gate 12 having a height $h_2$ a width W and a length $l_2$. Expansion cavity 14 of die 11 has a width equal to the width W of gate 12, a length $l_1$, and a height $h_1$.

Sprue 18 is an inlet for elastomeric material to enter gate 12.

Elastomeric material may be forced through sprue 18 with various pressure and speed, and the viscosity of the elastomeric material, together with its pressure and speed determine how the elastomer spreads out, is deformed and is oriented in gate 12.

Those skilled in the art will recognize that the size of the gate, the viscosity of the elastomer, the pressure exerted on the elastomer and the speed of the elastomer are somewhat interdependent.

When the elastomer is loaded with a fiber 20, these factors, together with the length $l_2$ of the gate 12, determine the orientation of the fiber 20 as it exits gate 12. Those skilled in the art recognize that fibers in an elastomer tend to orient in the direction of processing of the elastomer, and if the length $l_2$ of gate 12 is long enough, the length direction of fibers in an elastomer that is processed through gate 12 will be oriented in the direction of $l_2$ when the elastomer leaves gate 12.

As illustrated in commonly assigned PCT/US96/15237, which is incorporated herein by reference, in an expanding die, such as expanding die 11 illustrated herein, elastomer tends to exit gate 12 in the form of a ribbon 16. Since an elastomer tends to hold its shape, the ribbon form 16 of the elastomer is maintained as the elastomer enters into expansion cavity 14 of the expanding die 11, and as is illustrated in FIG. 4, the ribbon 16 tends to fold upon itself in expansion cavity 14. If the folds are compressed together in expansion cavity 14 to form a solid elastomer extrusion, the orientation of the fibers in the folds is maintained, and such fibers will be substantially perpendicular to the processing direction of the extrusion.

Thus, if fibers 20 are incorporated in an elastomer in sprue 18, and the fibers orient in the direction $l_2$ in gate 12, and maintain such orientation in ribbon 16 as it folds in expansion cavity 14, the fibers end up oriented in the direction of the height $h_1$ of expansion cavity 14. The fibers 20 are thus substantially oriented perpendicular to the width W and parallel to the height $h_1$ of the elastomer extrusion 17 that exits expansion cavity 14.

With reference now to FIG. 5, the extrusion mold 10 of the invention comprises a moving mold 10a and a fixed mold 10b, and therebetween expanding die plates 11. Fixed mold 10b is attached to fixed end 51 of cavity 55 of injection mold 50. Fixed mold 10b is so designated since it remains fixed to the working portion of injection mold 50, i.e., cavity 55 contains polymer 54 which is forced into fixed mold 10b by ram 52. By contrast, moving mold 10a is attached to pneumatic arm 56 which is used to provide the clamping force that presses moving mold 10a and fixed mold 10b together during operation of injection mold 50.

In the operation of an injection mold 50, a polymer is mixed and loaded into cavity 55 of an injection mold 50. Preferably, the injection mold is operated continuously until ram 52 forces all of polymer 54 out of cavity 55 through the extrusion mold 10 and out of expansion cavity 14 of expansion die 11.

Although the original concept of the invention was to orient fibers perpendicular to the surface of the tread in a tire, it was found that the orientation of the fibers could be varied by the speed of the extrusion, the lengths $l_1$ and $l_2$ of the gate 12 and expansion cavity 14, respectively, the viscosity of the elastomer and the height $h_2$ of gate 12. This observation suggested to the inventors that the process could be controlled to provide specific orientation of fibers or filers in specific parts of a product, a tire tread for example, for specialized purposes.

Using a tire tread as an example, the center of the tread may be prepared with fibers perpendicular to the tread surface to improve traction and treadwear, and fibers may be oriented at an angle of less than 90°, or less than all the fibers may be oriented at 90° in the outside shoulder of the tire, to improve stability and handling while turning, where opposite angles can be used in the inside shoulder of the tire to improve grip and steering properties.

Figure 5A:
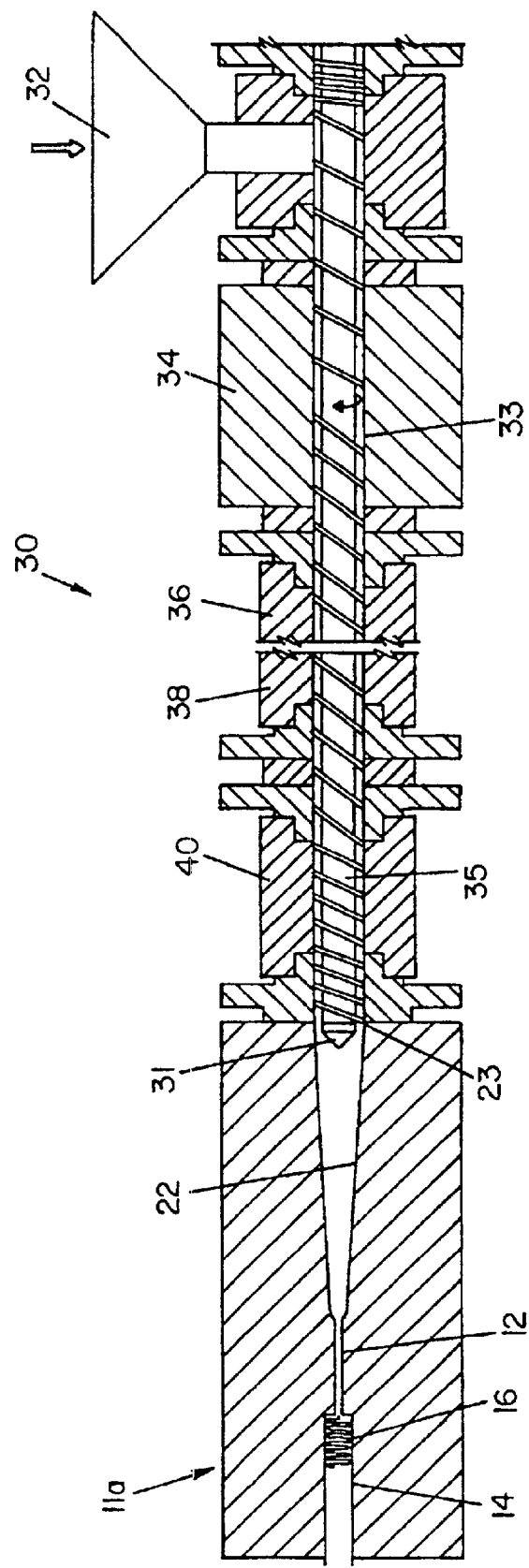
FIG. 5a illustrates an expanding die having a tapered inlet for use with an extruder.

With reference now to FIG. 5a, in an alternative embodiment, an extruder 30 can be used for continuously extruding polymer through an expanding die.

When extruder 30 is a twin screw extruder, continuous operation can be maintained, as illustrated in U.S. Pat. No. 5,711,904, which is incorporated herein by reference, since elastomer, and other ingredients of the elastomer composition, can be added to the twin screw extruder 30 through feed ports 32 which can be placed in barrel segments anywhere along the length of extruder barrel 33, and the ingredients mixed by the mixing action of screw 35. In the illustrated embodiment of FIG. 5, mixing segments 34 and 40, and portions of mixing segments 36 and 38 are shown.

In the method of the invention, an elastomer mix containing short fibers is extruded through end 31 of the extruder 30 into expansion die 11a.

Expansion die 11a is made having a tapered runner 22 which funnels the fiber containing elastomer through gate 12 and into expansion chamber 14.

Tapered runner 22, with a wide entry end 23 is adapted to receive elastomer from end 31 of the extruder without creating a large back pressure. Tapered runner 22, since it narrows as it approaches gate 12, is effective in partially orienting fibers in the elastomer in the direction of processing. Since the fibers are already partially oriented when they reach gate 12, it has been found that a short gate 12 can be used with expanding die 11a to achieve complete orientation of fibers in the processing direction. The expansion die otherwise functions in the same manner described above.

A shorter gate further reduces back pressure on the extruder 30. Reduced back pressure may be important due to pressure limitations encountered while extruding elastomers with a twin screw extruder.

An example of a twin screw extruder that can be used in the method of the invention is one that can handle pressure as high as 5,000 psi.

Figure 6:
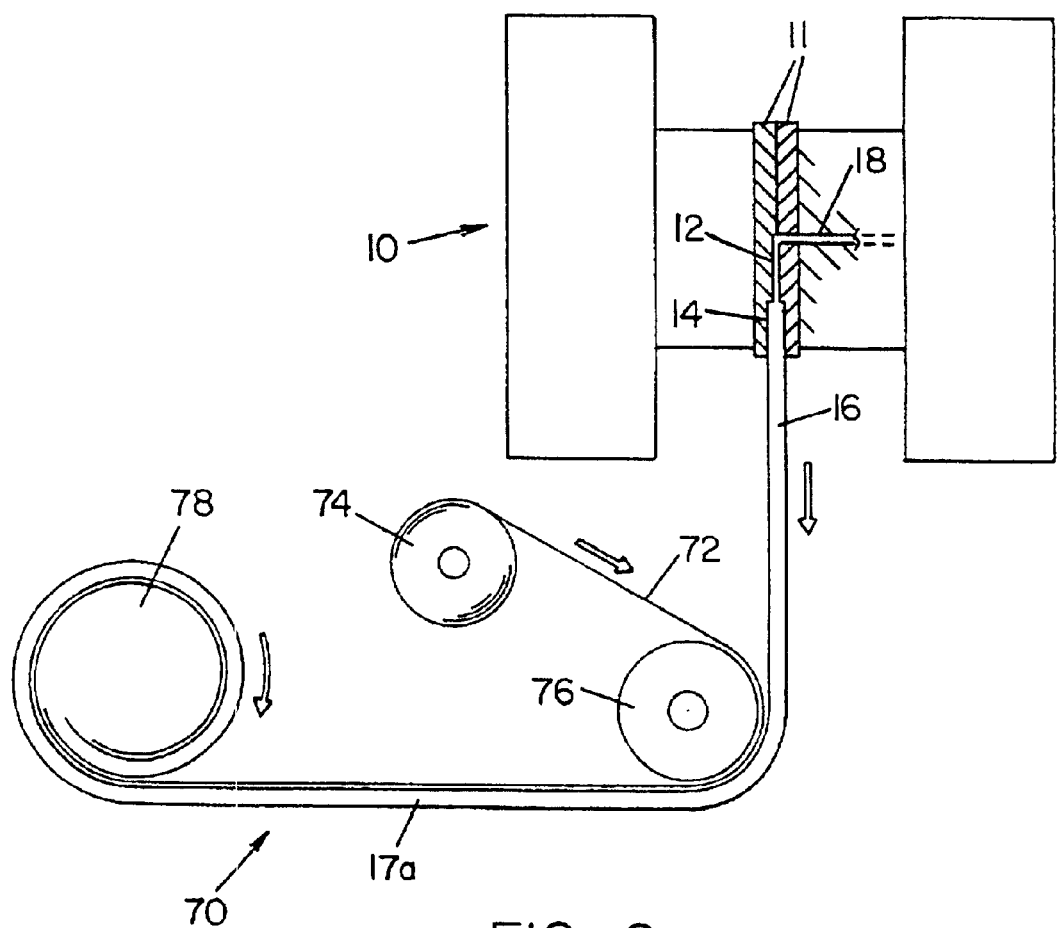
FIG. 6 illustrates a possible method of collecting elastomer extrudate from an expanding die.

With reference now to FIG. 6, in a continuous method of preparing an elastomeric component, a tread for example, apparatus 70 is used in conjunction with the injection mold 50, and extrudate 17 is combined with scrim 72 from scrim take off roll 74, over pulley 76, and a scrim/extrudate composite 17a is collected and stored on take up roll 78. Those skilled in the art will recognize that the same apparatus 70 can be used to collect extrudate from a twin screw extruder 30 as illustrated in FIG. 5a. Scrim 72 keeps extrudate 17 from sticking to itself and is removed when extrudate 17 is used as a component in an elastomeric product.

In the illustrated embodiment, scrim 72 is a smooth polymer that does not stick to the tread elastomer. The use of release paper, and other means to separate the layers of elastomer from each other will be apparent to those skilled in the art.

Figure 7:
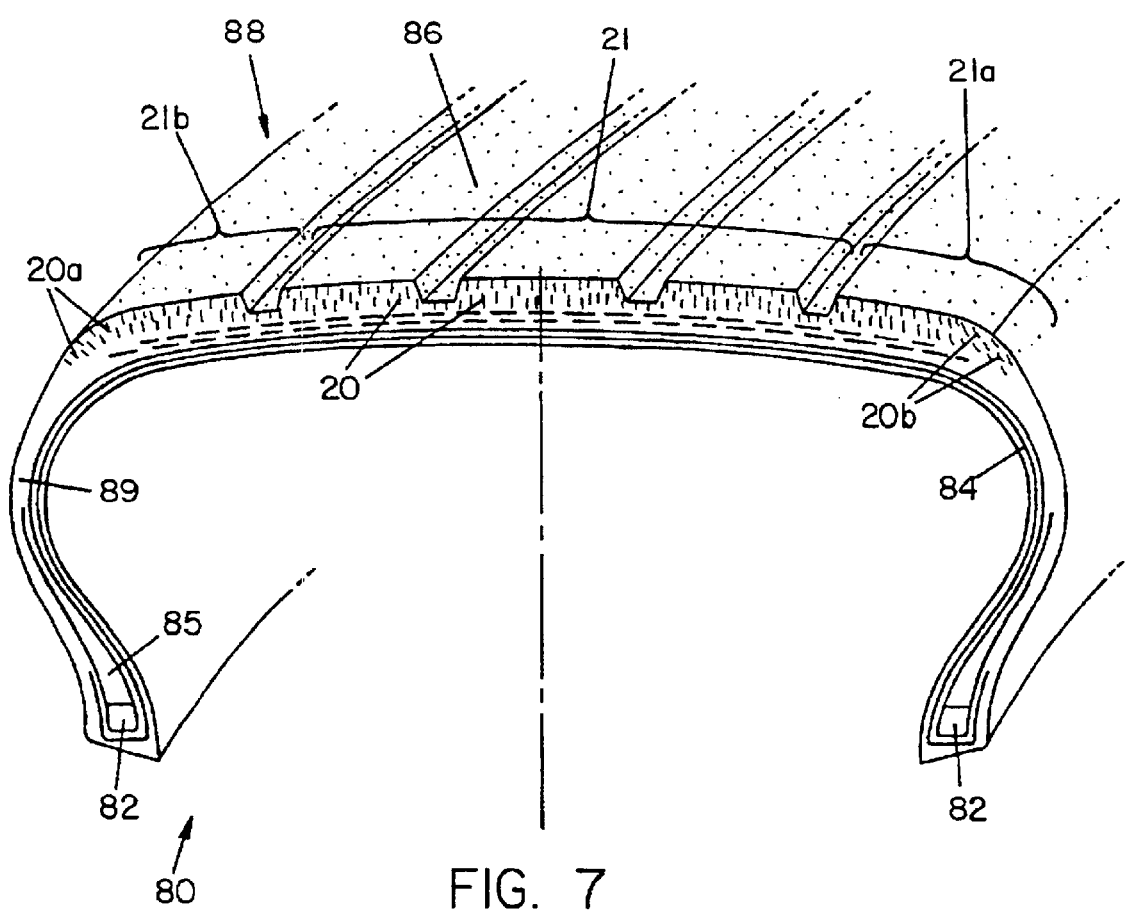
FIG. 7 illustrates a tire having oriented fibers in the tread.

With reference now to FIG. 7, a tire of the invention can be made having a fiber reinforced tire component where the fibers are oriented in any desired direction. In the illustrated embodiment, tire 80 has a tread 86 which is reinforced with fibers 20. It is believed that improved traction and treadwear will be seen in a tire where fibers are oriented perpendicular to the tread surface. In the illustrated embodiment, fibers 20 are oriented perpendicular to the tread surface at the center of the tread, whereas some fibers 20a are oriented at about 45° and away from the rubber surface on the inside shoulder of the tire, and at 45° and toward the surface of the tire in an outside shoulder of the tire. It is believed that the inside shoulder will have more grip in cornering since the modulus of the rubber is greatest in the direction of fiber orientation, and the rubber at the surface of the tread is softer where fibers are oriented away from the surface. By the same reasoning, the outside shoulder, reinforced with fibers 20b directed at the curvature of the shoulder and perpendicular to the shoulder surface, will be harder and more firm in cornering maneuvers where the outside shoulder carries the weight of the vehicle while cornering.

Those skilled in the art will recognize that other reinforced tire components may improve tire performance when reinforced with fibers having a specific orientation. For example, an apex 85 with radially oriented fibers may improve the bending stiffness of the lower sidewall of the tire. A sidewall 89 with axially oriented fibers may improve the scuff resistance of the sidewall.

Other uses for specifically oriented fibers in a tire will be apparent to those skilled in the art.

In developing the invention it was observed that a thinner gate and a longer gate will result in a higher degree of fiber orientation. Also, it was found that rubber compounds will fold in a mold cavity upon exiting the gate if the ratio of expansion, which is defined as the height $h_1$ or thickness of a mold cavity 14 to the height $h_2$ or thickness of a gate 12, is sufficiently large.

Continuous smooth extrudates were prepared successfully with both expanding dies (0.005 inch and 0.010 inch gate). Best extrudates were produced at 0.15 inch/s injection speed using 5 tons and 35 tons clamping force for the 0.005 inch and 0.010 inch expanding dies, respectively.

A continuous process using a twin screw extruder equipped with a specially designed expanding die was developed. It was found that continuous extrusion of treads with fibers oriented normal to the tread surface is possible with the expanding die technology, preferably with a high pressure (up to 5,000 psi) extruder.

An Engel injection molder is capable of handling pressure up to 29,000 psi. The extruder is filled and the compound is injected through the expanding die. Then, the process is repeated without removing the extrudate to provide a continuous sheet of extrudate. Because this process is different from a conventional extrusion or injection process, it is called an injection/extrusion process to distinguish it from previous technologies.

The invention is further illustrated with reference to the following examples.

EXAMPLE 1

Injection molding experiments were conducted using a 275 ton Engel injection molding machine equipped with a 0.1 inch plaque mold and with a fiber loaded race tire tread compound. The thickness of the mold cavity was 0.1 inch, which was the target thickness of the race tire tread. Five gates (thickness from 0.005 inch to 0.024 inch) and two injection speeds (0.05 inch/s and 0.2 inch/s) were used to prepare ten samples. This corresponded to expansion ratios of 4.2 to 20.0. The slower speed was used to simulate the slower extrusion process.

Seven test samples were taken from various locations of each sample to measure the fiber orientation by a solvent swelling method.

Testing showed that fibers were oriented at the gate in the process direction and the degree of fiber orientation increased with increasing injection speed or decreasing gate thickness.

Also, at the mold cavity immediately after the gate, there was almost no fiber orientation in the process direction, and ASR ranged from 0.962–1.060. The data also showed fiber orientation in the thickness direction at this location, and ASR ranged from 0.740–0.980. This indicated that the compound did fold in the mold cavity resulting in a 90 degree change in fiber orientation direction.

Down stream in the mold cavity, the degree of fiber orientation increased in the process direction due to reorientation of fibers.

The data showed the degree of fiber orientation increased with decreasing gate thickness and increasing processing speed. However, both will increase the pressure drop that may exceed the machine capability. The data also suggest that the land length of the large slit (expansion cavity 14) of the expanding die should be less than 1 inch so that re-orientation of fibers does not occur. This information was used to design the expanding die used in conducting extrusion trials.

| | | |
|---|---|---|
| Mold Temperature: | 40° F. set point | 220° F. actual |
| Barrel/Pot Temperature: | 200° F. | |
| Shot Size: | 53 inch | |
| Screw Speed: | % or 100 rpm | |
| Injection Speed: | .05 inch/s and 0.2 inch/s | |

A shot is a continuous extrusion of all the contents of an injection mold, and the length of a shot varies with the amount of elastomer loaded into the injection mold and the height and width of the extrudate.

Ten samples were prepared and fiber orientations of these samples were analyzed by the solvent swelling method.

In the solvent swelling method, a circular or rectangular sample of elastomer is immersed in toluene. Before adding solvent, and after the sample reaches equilibrium in the solvent, images of the sample are captured by video camera and stored in a computer. Then the dimensions of the sample in short and long axes are measured. The fiber orientation direction is in the short axis, and the degree of orientation as defined by the anisotropic swell ratio which was (ASR) was determined by: ASR=(swell ratio in short axis)/(swell ratio in long axis).

The swell ratio in the above equation is the length after swell divided by the length before swell. The smaller the ASR, the higher the degree of orientation. For an isotropic compound, the ASR value is 1. For a circular sample, there is no need to take pre-swell images because of the uniform size in all axes. The equation for calculating ASR is simplified to:

ASR=(length in short axis)/(length in long axis).

It should be noted that the land lengths were 1.25 inch for the 0.024 inch, 0.016 inch and 0.012 inch gates, but were reduced to 0.75 inch for the 0.010 inch gate and 0.25 inch for the 0.005 inch gate, respectively, due to the high injection pressure required.

Short shot samples were also made to see whether compound folding occurred. The samples clearly showed a compound folding structure, even for a gate as thick as 0.024 inch (an expansion ratio of only 4.2).

Increasing the injection speed or decreasing the gate thickness resulted in an increased degree of fiber orientation at the gate.

ASR ranged from 0.962–0.997 and 0.988–1.060 for injection speeds of 0.2 inch/s and 0.05 inch/s, respectively. Downstream of the gate, ASR decreased indicating an increased degree of fiber orientation in the process direction. This is expected due to flow in the process direction that resulted in re-orientation of the fibers. The data showed that the length of the large slit of the expanding die has to be less than 1 inch, so that re-orientation of fibers does not occur.

ASR data at the xz plane are also shown in Table 1. A smaller ASR means a higher degree of fiber orientation in the thickness direction. Without folding, fibers will be oriented in the process direction either at the gate or in the mold cavity and ASR measured on the xz plane should be close to 1. ASR ranged from 0.740–0.958 and 0.896–0.980 for 0.05 inch and 0.2 inch/sec, respectively.

Sample 1 was obtained from the gate, and samples 2 to 6 were obtained in sequence from the gate side of the mold to the outlet of the mold. Samples a and b are rectangular samples obtained at the location of samples 2 and 3.

TABLE 1

| Gate dimension thickness × length | Sample ID | 0.05 inch/sec speed | | 0.2 inch/sec speed | |
|---|---|---|---|---|---|
| | | xy plane | xz plane | xy plane | xz plane |
| 0.024 inch × 1.25 inch | 1 (gate) | 0.975 | | 0.817 | |
| | 2 or a | 1.051 | 0.931 | 0.962 | 0.933 |
| | 3 or b | 0.965 | 0.973 | 0.844 | 1.080 |
| | 4 | 1.028 | | 0.849 | |
| | 5 | 0.997 | | 0.874 | |
| | 6 | 1.042 | | 0.981 | |
| 0.016 inch × 1.25 inch | 1 (gate) | 0.900 | | 0.789 | |
| | 2 or a | 0.996 | 0.958 | 0.979 | 0.965 |
| | 3 or b | 1.005 | 1.039 | 0.929 | 1.010 |
| | 4 | 0.957 | | 0.851 | |
| | 5 | 1.019 | | 0.935 | |
| | 6 | 1.004 | | 0.977 | |
| 0.012 inch × 1.25 inch | 1 (gate) | 0.939 | | 0.766 | |
| | 2 or a | 0.988 | 0.910 | 0.983 | 0.980 |
| | 3 or b | 0.926 | 0.972 | 0.799 | 1.113 |
| | 4 | 0.914 | | 0.895 | |
| | 5 | 0.929 | | 0.932 | |
| | 6 | 0.931 | | 0.946 | |
| 0.010 inch × 0.75 inch | 1 (gate) | 0.912 | | 0.840 | |
| | 2 or a | 1.060 | 0.936 | 0.987 | 0.896 |
| | 3 or b | 0.994 | 0.944 | 0.875 | 1.074 |

TABLE 1-continued

| Gate dimension thickness × length | Sample ID | 0.05 inch/sec speed | | 0.2 inch/sec speed | |
|---|---|---|---|---|---|
| | | xy plane | xz plane | xy plane | xz plane |
| | 4 | 0.999 | | 0.861 | |
| | 5 | 0.973 | | 0.812 | |
| | 6 | 1.064 | | 0.838 | |
| 0.005 inch × 0.25 inch | 1 (gate) | | | | |
| | 2 or a | 1.002 | 0.740 | 0.997 | 0.902 |
| | 3 or b | 1.025 | 0.990 | 0.895 | 1.021 |
| | 4 | 0.971 | | 0.895 | |
| | 5 | 0.919 | | 0.821 | |
| | 6 | 0.916 | | 0.881 | |

EXAMPLE 2

This experiment was conducted to develop a continuous extrusion process for preparing short-fiber reinforced race tire treads with fibers oriented perpendicular to the tread surface.

An expanding die was designed for use with a Berstorff twin-screw extruder (FIG. 5a). The die assembly consists of a tapered section 22 that connects to the outlet 31 of the extruder, a small slit 12 and a large slit 14. The height $h_1$ of the large slit is 0.1 inch. Three extrudates were prepared under identical conditions (barrel temperature and screw RPM) with three sizes of the small slit (0.005 inch, 0.007 inch and 0.010 inch thickness).

These corresponded to expansion ratios of 20, 14.3 and 10. The lengths of the three sections are 0.75 inch, 0.25 inch and 0.375 inch, respectively.

All three extrudates showed folding structure when packing in the large slit was prevented. The folding was tight and uniform for the extrudate made with the 0.005 inch slit and became loose and irregular as the thickness of the slit increased.

Fibers were oriented perpendicular to the tread surface and the degree of orientation increased with decreasing thickness of small slit or increasing die expansion ratio. The anisotropic swell ratios (ASR) ranged from 0.793–0.946. Swelling data also showed there was little fiber orientation in the extrusion direction of the extrudate. ASR values obtained were close to 1.0 for all three extrudates.

The degree of fiber orientation in the thickness direction of the tread was much lower than that of the precursor sheet. ASR values were 0.776 for the precursor sheet and 0.946 for the tread prepared with a 0.010 inch slit. This showed that the low degree of fiber orientation in the tread was due mainly to the loose and irregular folding observed.

High pressure capability, up to 5,000 psi, is required to extrude rubber without shut-down or leakage due to the small cross-sectional area of the small slit.

From data obtained earlier, we knew 0.25 inch length is sufficient to orient the fibers for the 0.005 inch slit, but may not be enough for the 0.007 inch and 0.01 inch slits. However, due to the additional tapered section that also orients the fibers, the length of all small slits was kept at 0.25 inch.

Alteration of fiber orientation direction occurs in the large slit due to folding action. The required length of the large slit should be less than 1 inch otherwise reorientation of fibers will occur, but the large slit has to be long enough so that compound will pack before leaving the die. For this experiment, we used one 0.375 inch long large slit and could add an additional 0.0375 inch piece if the length was not sufficient for the compound to pack.

The trials were conducted using a Berstorff ZE40A co-rotating, intermeshing, twin-screw extruder, as illustrated in U.S. Pat. No. 5,711,904 to Eswaren et al. The screw profile contained a single mixing section to soften the stock without adding unnecessary heat to the material or load on the extruder. The compound was fed as strips, approximately ½ inch wide, of fiber loaded race tire tread compound. The strips were fed into the opening where the feed hopper is normally mounted.

The extruder was divided into 6 barrel segments and a feed zone section. The extruder is specified to handle pressures up to 5,000 psi. The die head used (FIG. 5a) did not have a pressure transducer. The closest pressure transducer was in the upstream port in the sixth barrel segment 40. Table 2 shows the conditions at which samples were collected with each of the die openings.

TABLE 2

Twin Screw Extrusion Run Conditions

| Thickness of Small Slit | 0.005 inch | 0.007 inch | 0.01 inch |
|---|---|---|---|
| Expansion Ratio | 20:1 | 14.5:1 | 10:1 |
| Screw Speed (RPM) | 40 | 40 | 40 |
| Set Barrel temperatures (° F.) | 150 | 150 | 150 |
| Extruder torque (%) | 58 | 46 | 38 |
| Barrel Segment 6 pressure | 2245 | 3016 (a) | 2260 |
| Leakage? | Yes | Yes | No |

(a) pressure exceeded transducer limit (3016 psi) before leakage occurred.

Extrusion Experiment: With the two smaller slit openings (0.005 inch and 0.007 inch), packed extrudate was produced first, but rubber eventually leaked out between the head flange and last barrel segment and the trials had to be shut down. This was due to the high pressure generated that exceeded the maximum sealing pressure of the tie rods, 5000 psi. There was no leakage for the 0.010 inch small slit and smooth extrudate was produced continuously. All three extrudates showed folding structure when packing in the large slit was prevented either due to leakage or by stretching slightly. Folding was tight and uniform for the extrudate made with a 0.005 inch slit. The folding became loose and irregular as the thickness of the slit increased. This indicated that the degree of fiber orientation in the thickness direction will be reduced with increasing thickness of the small slit. This may due to the reduced compound speed through the small slit or a reduced expansion ratio. The volumetric flow rates through the three small slits are the same due to same screw speeds, but the linear compound speed through the 0.007 inch and 0.010 inch slits were 28.6% and 50% slower than the speed through the 0.005 inch slit due to increased cross-sectional areas.

Fiber Orientation: Two samples were taken from each packed extrudate to analyze the degree of fiber orientation. Results are given in Table 3.

TABLE 3

Degree of Fiber Orientation of Extruded Samples.

| Thickness Of Small Slit | Expansion Ratio | xy plane sample | | | | xz plane sample | |
|---|---|---|---|---|---|---|---|
| | | Green Samples | | Cured Samples | | Cured Samples | |
| | | ASR | reference direction | ASR | reference direction | ASR | reference direction |
| 0.005 inch | 20 | 1.029 | x | 0.946 | x | 0.793 | z |
| 0.007 inch | 14.3 | 1.000 | x | 0.916 | x | 0.887 | z |
| 0.010 inch | 10 | 1.110 | x | 0.936 | x | 0.946 | z |

Fiber orientation direction is the reference direction if ASR < 1;
Fiber orientation direction is 90° to the reference direction if ASR > 1;
No fiber orientation, i.e., random or isotropic if ASR = 1

There was little fiber orientation on the xy plane of the extrudates. ASR values of xy samples were close to 1.0 for all three extrudates. They ranged from 1.000–1.029 and 0.916–0.946 for green and cured samples, respectively. Cured samples showed slight orientation in the extrusion direction that may be due to slight flow or relaxation during curing. The ASR data on the xz plane showed the fibers were indeed oriented in the thickness direction, or perpendicular to the tread surface, and that the degree of orientation increased with decreasing thickness of the small slit. The ASR values of xz samples ranged from 0.793–0.946. These data are consistent with the observed extrudates.

EXAMPLE 3

As an alternative to extrusion, trials were conducted using a 275-ton Engel injection molding machine. The compound used was a fiber loaded race tire tread compound. The compound contained 1.5 phr Kevlar pulp. Table 4 shows the operating conditions of the experiment.

TABLE 4

Run Conditions of Injection/Extrusion Experiments

| | | |
|---|---|---|
| Barrel/Pot Temperatures | Set point | 200° F. |
| | Actual | 200° F. |
| Mold Temperatures | Set point | 250/250° F. |
| | Actual | 225/225° F. |
| Injection speed | | 0.05–0.15 inch/s |
| Clamping Tonnage | | 5–35 ton |

The trial was started for the expanding die #1 (0.005 inch to 0.100 inch expansion).

By experimentation, the best conditions for injection speed and clamp force were determined.

Trials for expanding Die #2 (0.010 inch to 0.110 inch expansion) were begun with 0.15 inch/sec injection speed and 5 ton clamp force, the best condition for Die #1. The extrudate had a wavy pattern in the center indicating the compound flowed faster at the center. This was due to a slight difference in thickness across the gate. Increasing the clamp force up to 35 tons solved the problem. Smooth extrudate was produced at 0.15 inch/sec injection speed and 35 ton clamp.

The two best extrudates were selected for fiber orientation analysis by a solvent swell method and tested for Instron modulus in two directions (parallel and normal to the extrusion direction).

Packed smooth extrudates were produced with both expanding dies (0.005 inch and 0.010 inch gate). There was no compound leakage as occurred during the twin screw extrusion trial. This showed that the injection molding machine was capable of handling the high pressure required to push the compound through the thin gate. A slight variation in thickness of gate samples that resulted in a wavy pattern of extrudate was discovered in initial trials. After measuring the thickness of the whole die plate, it was realized the uniformity of the whole die plate was the problem. If it is thicker in the center, even just slightly, it will push the center parts of the gate closer after being clamped tightly. This results in slightly smaller thickness and slower flow in the center. The reverse is true if it is thinner in the center. The problem was solved by varying the clamp force.

Two kinds of samples were taken from each packed extrudate at various locations to analyze the degree of fiber orientation by the solvent swelling method. One is a round sample for measuring the fiber orientation on the xy plane and the other is a rectangular type sample used for measuring fiber orientation on the xz plane.

Results of the solvent swell measurements are given in Table 5. The numbers given are the anisotropic swell ratios and standard deviation of the test (ASR±Standard Deviation).

TABLE 5

Average Degree of Fiber Orientation of Extruded Samples
ASR measurement direction: x/y or x/z.

| Die ID | Gate thickness | xy plane sample | | xz plane sample | |
|---|---|---|---|---|---|
| #1 | 0.005 inch | 0.931 | 0.024 | 0.895 | 0.088 |
| #2 | 0.010 inch | 0.933 | 0.017 | 0.907 | 0.038 |

Die #1 has a thinner and shorter gate as compared to Die #2. The thinner gate resulted in better orientation, and the shorter gate resulted less orientation for the compounds used in this example.

The expected fiber orientation structure for perfect folding condition is random on the xy plane (ASR=1) and oriented in the thickness direction of the xz plane. The main reason that fibers were oriented in the width direction was the way compound distributed prior to the gate. The compound flowed out of the sprue located at the center of the die plate into a 0.125 inch radius runner prior to the tapered zone and gate. This resulted in width direction flow and fiber orientation. The tapered zone and gate should re-orient the fiber in the extrusion direction, but did not completely do the job. This was confirmed from solvent swell measurements of gate samples. The fibers were oriented at 10–14° with respect to the extrusion direction as shown by an ASR which ranged from 0.69–0.82.

Although fibers were not completely oriented normal to the tread surface as first envisioned, the fiber orientation direction was not parallel to the extrusion direction as when prepared by a standard extrusion process. It occurred to the inventors that the width direction orientation in the tread may improve the lateral stiffness and thus the cornering property of the tire.

It is believed that complete orientation can be achieved by increasing the gate length. Other adjustments that will achieve complete orientation will be apparent to those skilled in the art.

EXAMPLE 4

This example illustrates making tires using a tread component with oriented fibers.

Kevlar pulp reinforced tread extrudates were prepared using an Engel injection molding machine and an expanding die designed to orient the Kevlar pulp short fibers perpendicular to the tread surface. The compound used contained 1.5 phr Kevlar pulp. The treads were formed by splicing together 5 inch wide extrudates width-wise with the splices located in the groove area of the tire treads. A total of 16 race tire treads (8 front and 8 rear) were assembled for curing and road tests. The tires were cured with no defects and sent to Spain for road testing on a private track. The treads prepared were submitted for various physical property tests. In addition, the extrudates were analyzed for fiber orientation by the solvent swell method and tested for Instron modulus in three directions.

With the expanding die, the normal extrusion direction orientation was prevented. The fibers were oriented in the thickness direction inside the sample (ASR=0.881), but the degree of orientation gradually reduced from the center to the surface (ASR=1.009) of the sample. This was due to the folding mechanism as well as the shear provided by the cavity wall.

The data showed that the increase in modulus due to fiber reinforcement is mainly in the fiber orientation direction. The compound with 1.5 phr Kevlar pulp would approximately double the 300% modulus in the fiber direction, but had only slightly higher 300% modulus in the 90° to fiber orientation direction as compared to the non-fiber loaded control compound.

The data showed fiber reinforcement has little effect on rebound or Tan 6 values.

The thickness of the tread required for the tire was 0.14 inch. Three expanding dies tested had 0.010 inch gate thickness and 0.14 inch cavity thickness, but differed in gate and cavity lengths. No tapered zone was used in the expanding dies. Details of these die configurations are shown in Table 6 below:

TABLE 6

Configuration of Expanding Dies

| ID | Dimension | Gate | Cavity |
|---|---|---|---|
| #1 | thickness | 0.010 inch | 0.140 inch |
|  | length | 1.25 inch | 1.25 inch |
| #2 | thickness | 0.010 inch | 0.140 inch |
|  | length | 0.75 inch | 0.602 inch |
| #3 | thickness | 0.010 inch | 0.140 inch |
|  | length | 1 inch | 1 inch |

Trials with Die #3, were most successful under the conditions encountered. Smooth extrudate was produced without problem. This die was used in producing the treads for the tire build.

Injection/Extrusion Experiments

The process is semi-continuous with a 3 inch long shot size (three inch cavity expansion in injection mold) that produced about a 38 inch long extrudate per shot. The 3 inch shot size was chosen because longer shots increased the gate temperature high enough to cause extrudate to heat up, soften and break under its own weight.

Table 7 shows the operating conditions of the experiment.

TABLE 7

Run Conditions of Injection/Extrusion Experiments

| Barrel/Pot Temperatures | Set point | 200° F. |
|---|---|---|
|  | Actual | 200° F. |
| Mold Temperatures | Set point | 250/250° F. |
|  | Actual | 230/230° F. |
| Injection speed |  | 0.1 inch/sec |

A windup system was incorporated to continuously wind up the 5 inch wide 0.014 inch thick extrudate with release paper in between. Each windup roll contained 16 shots of extrudates, which is enough to make one front and one rear tire.

Tread Preparation

The front tire is 11.2 inches wide and has 3 grooves, while the rear tire is 15.2 inches wide and has 4 grooves. The circumferential splices were aligned with the grooves to prevent the splices from opening during use, this required 3 strips and 4 strips of the 5 inch wide extrudate for a front and a rear tire, respectively. These extrudates were hand laid up to the correct widths using a jig to control the tread width. The splices were cut with an electric hot knife at an angle to create a very strong knitted splice. A total of 12 tires were built (6 front and 6 rear) and cured. All 12 tires passed inspection with no visible evidence of the splices. These tires were sent to Spain for road tests on a private track.

Samples of the extrudate were tested for fiber orientation. The data showed that fibers were essentially random on either the xy or xz plane. The fibers were oriented only slightly in the extrusion direction on the xy plane or the thickness direction on the xz plane.

Physical Properties of Injected/Extruded Compound:

To examine the effect of fiber reinforcement on this compound, tread was also prepared under identical operating conditions with non-fiber loaded control compound and tested for Instron modulus in two directions. To obtain a correlation between anisotropic swell ratio and modulus ratio, both fiber loaded and non-fiber compounds were milled in two gauges (0.125 inch and 0.062 inch), cured, and tested for Instron modulus and fiber orientation. Results are given in Table 8.

TABLE 8

Instron Modulus and Fiber orientation

| Com-pound | Process | Testing direction | Instron Modulus (Large sample, 4.5 x 20 mm) | | | | | ASR |
|---|---|---|---|---|---|---|---|---|
|  |  |  | 10% | 20% | 50% | 100% | 300% |  |
| 23 | Ext/Inj | Extrusion | 0.77 | 0.96 | 1.14 | 1.31 | 2.70 | 0.975 |
|  |  | Width | 0.66 | 0.79 | 1.02 | 1.35 | 2.94 |  |
| 38 | Ext/Inj | Extrusion | 0.56 | 0.69 | 0.85 | 0.93 | 2.27 |  |
|  |  | Width | 0.60 | 0.70 | 0.83 | 1.00 | 2.71 |  |
| 23 | Milled 0.125 inch | Milled | 1.27 | 2.05 | 2.82 | 3.05 | 5.02 | 0.767 |
|  |  | Width | 0.78 | 0.95 | 1.18 | 1.46 | 3.04 |  |
|  | Milled | Milled | 2.06 | 2.79 | 3.29 | 3.44 | 5.47 | 0.684 |

TABLE 8-continued

Instron Modulus and Fiber orientation

| Com-pound | Process | Testing direction | Instron Modulus (Large sample, 4.5 × 20 mm) | | | | | ASR |
|---|---|---|---|---|---|---|---|---|
| | | | 10% | 20% | 50% | 100% | 300% | |
| | 0.062 inch | Width | 0.81 | 0.89 | 0.97 | 1.09 | 2.33 | |
| 38 | Milled | Milled | 0.66 | 0.78 | 0.92 | 1.06 | 2.72 | |
| | 0.125 inch | Width | 0.68 | 0.80 | 0.89 | 0.95 | 2.24 | |
| | Milled | Milled | 0.76 | 0.88 | 1.01 | 1.14 | 2.81 | |
| | 0.062 inch | Width | 0.76 | 0.84 | 0.91 | 0.97 | 2.17 | |

The data showed that the increase in modulus due to fiber reinforcement is mainly in the fiber orientation direction.

The moduli are 100%–200% higher in the fiber direction, but are only 10%–50% higher in the 90° to fiber direction than their respective milled compounds. As the degree of orientation increased, the moduli increased in the fiber orientation direction and decreased in the 90° to fiber direction. For a compound with highly oriented fibers (milled at 0.062 inch gauge, ASR=0.687), the moduli at 90° to fiber orientation direction approached those of a non-filled compound.

The data showed this compound with 1.5 phr Kevlar would approximately double the 300% modulus in the fiber direction, but had only moderately higher 300% moduli in the 90° to fiber orientation direction. Because the 300% modulus of injected/extruded compound is only about 19% and 8.5% higher in the extrusion (y) and width (x) directions than the non-fiber control compound. This suggests that the fibers in the extruded compound were not oriented in either x or y direction, and thus should be oriented mainly in the thickness (z) direction of the tread.

Accordingly, a low modulus rubber was used to make the fiber loaded tread, because of the expected increase in modulus due to fiber orientation.

Road tests showed that the fiber loaded tires had better lap times, but the grooves were gone only after a few laps. This was due mainly to the low modulus of the fiber loaded compound. The 300% ATS modulus of this compound was 3.95 MPa vs 5.52 MPa for the control tire and the fibers did not increase the modulus, in general, as much as expected. This was because the fibers oriented in the thickness direction increased the modulus due to fiber reinforcement mainly in the thickness direction only, and apparently cornering in the turns caused rapid wear of the test tires.

There was a slight fiber orientation in the width direction of the tread on the 90° plane which may result in improved lateral stiffness, cornering property and wear resistance.

What is claimed is:

1. A method of continuously producing fiber reinforced elastomer components having length, depth and width and having fiber orientation at angles to the length direction of said component, the method comprising the sequential steps of (a) extruding or injecting a fiber reinforced elastomer comprising elastomer and fibers, (b) forcing said elastomer through a die (11) having a gate (12), whereby, due to the length $l_2$ of the gate the fibers (20) will be oriented in the direction of the gate length $l_2$ when the elastomer leaves the gate (12);

(c) providing an expansion cavity (14) in said die (11) adjacent to said gate (12);

(d) controlling the viscosity of said elastomer such that the elastomer passes through said gate (12) as a ribbon (16) of elastomer;

(e) maintaining the orientation of the fibers in the ribbon (16) as it folds in the expansion cavity (14), the fibers ending up oriented in the direction of the height (h1) of expansion cavity (14), whereby the fibers (20) are substantially oriented perpendicular to the width W of the gate and parallel to the height h1 expansion cavity in the of the folded ribbon (16) forming the fiber reinforced elastomer component;

(f) collecting said component for storage or for direct use in an elastomeric product, characterized in that the gate (12) has a gap height $h_2$ larger than the average length of said fibers;

in that the viscosity of said elastomer as the elastomer enters the gate (12) is maintained at Mooney viscosity of 30 to 80, and in that the elastomer is processed at a speed of 100 to 1000 nm/sec linear speed at the gate (12) and 1 to 100 mm/sec in the expansion cavity (14).

2. The method of claim 1 wherein an injection mold (50) is used for orienting fibers in an elastomer and further comprising the steps of attaching the die (11) to said injection mold (50);

forcing fiber reinforced elastomer through a sprue (18) using a rain (52);

collecting the component (17) having oriented fibers (20) therein on a collection roll (78).

3. The method of claim 2 comprising the step of applying a scrim (72) to said component (17) as said component is collected.

4. The method of claim 2 comprising the steps of applying a ram pressure of 10 to 30 thousand psi (69 to 207 MPa) on the fiber reinforced elastomer with the ram (52);

applying a clamp force of 35 tons (256 kN) with a pneumatic arm (56) against the die (11).

5. The method of claim 4 comprising the steps of selecting said die (11) such that the gate length $l_2$ is 0.75 inch to 1.25 inches (1,9 to 3,18 cm), the length $l_1$ of the expansion cavity is 0.60 inch to 1.25 inches (1,52 to 3,18 cm), the height $h_1$ of the expansion cavity is 0.01 inch (0,03 cm), the height $h_2$ of the gate is 0.14 inch (0,36 cm) and the gate width W is 5 inches (12,7 cm).

6. The method of claim 1 wherein an extruder (30) is used for orienting fibers in an elastomer, and the die (11) is an expanding die, the die having a tapered runner leading into the gate (12), and further comprising the steps of attaching the expanding die (11a) to the end (31) of the extruder (30);

feeding an elastomer and fibers into the extruder (30) through an inlet (32);

mixing said elastomer fibers in said extruder (30);

feeding the fiber reinforced elastomer through an end (31) of the extruder (30) into the tapered runner (22) of the die (11a), and collecting the fiber reinforced elastomer component (17a) from the die (11a).

7. The method of claim 6 comprising the steps of maintaining an extrusion pressure in said extruder (30) at 5000 psi (34 MPa), and maintaining a clamping pressure on said die at 5000 psi (34 MPa).

8. The method of claim 1, 2 or 6 comprising the further step of providing the expansion cavity (14) with a gap height h1 of 10 to 100 times the gap height h2 of said gate.

9. The method of claim 1, 2 or 6 comprising the further step of using a 1 to 6 phr aramid pulp as reinforcing fiber in said elastomer.

10. The method of claim 1, 2 or 6 comprising the further step of forming a tire component with said die and the expansion cavity (14) has a length of 1.25 to 5.0 mm.

\* \* \* \* \*